United States Patent
Werner et al.

(10) Patent No.: US 12,242,362 B1
(45) Date of Patent: Mar. 4, 2025

(54) AUTONOMOUS DATA SHARDING AND TOPOLOGY ALTERATIONS FOR DISASTER RECOVERY PREPARATION

(71) Applicant: International Business Machines Corporation, Armonk, NY (US)

(72) Inventors: John S. Werner, Fishkill, NY (US); Elton de Souza, Scarborough (CA); Sneha Mary Varghese, Fishkill, NY (US); Diane Marie Stamboni, Poughkeepsie, NY (US); Kavita Sehgal, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 18/449,155

(22) Filed: Aug. 14, 2023

(51) Int. Cl.
| | | |
|---|---|---|
| G06F 11/30 | (2006.01) | |
| G06F 11/14 | (2006.01) | |
| G06F 11/20 | (2006.01) | |
| G06F 11/34 | (2006.01) | |
| G06F 16/27 | (2019.01) | |

(52) U.S. Cl.
CPC ...... G06F 11/2028 (2013.01); G06F 11/1464 (2013.01); G06F 11/3419 (2013.01); G06F 16/27 (2019.01)

(58) Field of Classification Search
CPC ............. G06F 11/1464; G06F 11/2028; G06F 11/3419; G06F 16/27
USPC .......................................... 714/4.11, 6.24, 15
See application file for complete search history.

(56) References Cited

U.S. PATENT DOCUMENTS

| | | | |
|---|---|---|---|
| 8,630,983 | B2 | 1/2014 | Sengupta |
| 9,575,848 | B2* | 2/2017 | Goodman ........... G06F 11/1461 |
| 9,659,079 | B2 | 5/2017 | Vasantham |
| 9,792,320 | B2 | 10/2017 | Bercovici |
| 10,909,102 | B2 | 2/2021 | Wang |
| 10,977,132 | B2 | 4/2021 | Deshpande |
| 10,977,229 | B2 | 4/2021 | Kunnatur |
| 11,074,129 | B2 | 7/2021 | Horn |
| 11,330,169 | B2 | 5/2022 | Kim |

(Continued)

OTHER PUBLICATIONS

Alquraan et al., "Scalable, Near-Zero Loss Disaster Recovery For Distributed Data Stores", Proceedings of the VLDB Endowment, vol. 13, No. 9, ISSN 21508097, printed on May 15, 2023, 14 pages.

(Continued)

*Primary Examiner* — Chae M Ko
(74) *Attorney, Agent, or Firm* — Kimberly Zillig

(57) ABSTRACT

A computer-implemented method, a computer program product, and a computer system for data sharding and topology alterations for disaster recovery preparation. A computer system estimates time needed to copy a data store of a data center that is assumed offline. A computer system determines whether the time needed is greater than a recovery time objective (RTO). A computer system creates a data shard for the data store, in response to determining that the time needed is greater than the RTO. Prior to the data center being offline, a computer system alters a current topology of the data store in a network connecting multiple data centers, by copying the data shard to a destination data center that does not contain the data store in the current topology, where, with an altered topology, the RTO is met in an event of the data center being offline.

20 Claims, 9 Drawing Sheets

(56) References Cited

U.S. PATENT DOCUMENTS

| | | |
|---|---|---|
| 11,409,711 B2 | 8/2022 | D'Halluin |
| 11,514,024 B2 | 11/2022 | Yin |
| 11,733,907 B2 * | 8/2023 | Said .................... G06F 11/1471 711/162 |
| 2016/0335162 A1 * | 11/2016 | Jin ...................... G06F 11/1474 |
| 2017/0371910 A1 | 12/2017 | Joo |
| 2020/0073802 A1 * | 3/2020 | Pradhan .............. G06F 11/1435 |
| 2021/0058320 A1 | 2/2021 | Vutharkar |
| 2021/0334172 A1 | 10/2021 | Meadowcroft |
| 2022/0027242 A1 | 1/2022 | Shoolman |
| 2023/0009909 A1 | 1/2023 | Porter |
| 2023/0021868 A1 | 1/2023 | Bierner |

OTHER PUBLICATIONS

Divija Swetha Gadiraju et al., "Secure Regenerating Codes For Reducing Storage And Bootstrap Costs In Sharded Blockchains", arXiv:2011.06201v1 [cs.CR] Nov. 11, 2020, 8 pages.

Kvet et al., "The Complexity Of The Data Retrieval Process Using The Proposed Index Extension", IEEE Access, vol. 10, 2022, Received Feb. 22, 2022, accepted Apr. 21, 2022, date of publication Apr. 26, 2022, date of current version May 4, 2022, 27 pages.

Mukhopadhyay et al., "Efficient Reconstruction Techniques For Disaster Recovery In Secret-Split Datastores", 2018 IEEE International Symposium on the Modeling, Analysis, and Simulation of Computer and Telecommunication Systems, 13 pages.

Rahnama et al., "RingBFT: Resilient Consensus Over Sharded Ring Topology", arXiv:2107.13047v2 [cs.DB] Mar. 23, 2022, 16 pages.

* cited by examiner

AUTONOMOUS DATA SHARDING AND TOPOLOGY ALTERATIONS FOR DISASTER RECOVERY PREPARATION

BACKGROUND

The present invention relates generally to disaster recovery preparation for data storage across multiple data centers, and more particularly to autonomous data sharding to meet the recovery time objective (RTO) in an event of a disaster that takes one or more data centers offline.

Disaster recovery and Disaster Recovery as a Service (DRaaS) are currently hot topics in cloud computing and in business. DRaaS solutions are a predetermined set of processes offered by a third-party vendor to help an enterprise develop and implement a disaster recovery plan. Each DRaaS offering will define in a service level agreement (SLA) what its promised recovery point objective (RPO) and recovery time objective (RTO) are. The RPO refers to a time point in the past to which data storage across multiple data centers will be recovered after a disaster (i.e., the time point to which all data will be backed up, and data in a gap between the disaster and the RPO may be lost as a result of the disaster). The RTO refers to a time point in the future at which data storage across multiple data centers will be restored.

There are instances where an active-active configuration is desired but is not possible due to SLAs with strict RTOs and low RPOs. An active-active or stretched clustering configuration is the deployment of a second identical live data center which continually replicates with a first data center. This framework will typically consist of only two data centers. A typical data store topology may have three or more data centers where a copy of all data exists in at least two of the data centers such that, in an event that takes a data center offline, a new copy will be needed to be created on remaining data centers to meet the SLA such that a backup is always available. With asynchronous replication strategies, the RPO is limited by network speed and the amount of data that is needed to be migrated. Currently, there is no autonomous mechanism to optimize for both RPO and RTO in multi-site configurations for large data sets, especially with non-uniform amounts of total storage capacity across the data centers.

SUMMARY

In one aspect, a computer-implemented method for data sharding and topology alterations for disaster recovery preparation is provided. The computer-implemented method includes estimating time needed to copy a data store of a data center that is assumed offline. The computer-implemented method further includes determining whether the time needed is greater than a recovery time objective (RTO). The computer-implemented method further includes, in response to determining that the time needed is greater than the RTO, creating a data shard for the data store. The computer-implemented method further includes, prior to the data center being offline, altering a current topology of the data store in a network connecting multiple data stores, by copying the data shard to a destination data center that does not contain the data store in the current topology, where, with an altered topology, the RTO is met in an event of the data center being offline.

In another aspect, a computer program product for data sharding and topology alterations for disaster recovery preparation is provided. The computer program product comprises a computer readable storage medium having program instructions embodied therewith, and the program instructions are executable by one or more processors. The program instructions are executable to: estimate time needed to copy a data store of a data center that is assumed offline; determine whether the time needed is greater than a recovery time objective (RTO); in response to determining that the time needed is greater than the RTO, create a data shard for the data store; and prior to the data center being offline, alter a current topology of the data store in a network connecting multiple data stores, by copying the data shard to a destination data center that does not contain the data store in the current topology, where, with an altered topology, the RTO is met in an event of the data center being offline.

In yet another aspect, a computer system for data sharding and topology alterations for disaster recovery preparation is provided. The computer system comprises one or more processors, one or more computer readable tangible storage devices, and program instructions stored on at least one of the one or more computer readable tangible storage devices for execution by at least one of the one or more processors. The program instructions are executable to estimate time needed to copy a data store of a data center that is assumed offline. The program instructions are further executable to determine whether the time needed is greater than a recovery time objective (RTO). The program instructions are further executable to, in response to determining that the time needed is greater than the RTO, create a data shard for the data store. The program instructions are further executable to, prior to the data center being offline, alter a current topology of the data store in a network connecting multiple data stores, by copying the data shard to a destination data center that does not contain the data store in the current topology, where, with an altered topology, the RTO is met in an event of the data center being offline.

DETAILED DESCRIPTION

Embodiments of the present invention disclose a system and method for autonomous data sharding and data store topology alterations for disaster recovery preparation. In the embodiments of the present invention, the disclosed system monitors resources across a network connecting multiple data centers, estimates the time to create a backup of data from a first data center to a second data center in an event of a disaster that takes one or more data centers offline, creates data shards if the estimated time does not meet the recovery time objective (RTO), and copies the data shards to other data centers to ensure that a backup of data is always available such that RTO will be met in the event of the disaster. Copying the data shards to other data centers changes a topology of data stores across multiple data centers in the network. By constantly altering the data store topology, the disclosed system and method guarantee that both the RTO and the recovery point objective (RPO) are met in the event of the disaster. In the event of a disaster, the present invention ensures that all the data can be transferred between the remaining data centers within the RTO and ensure that at least two copies if the data are present.

Figure 1:
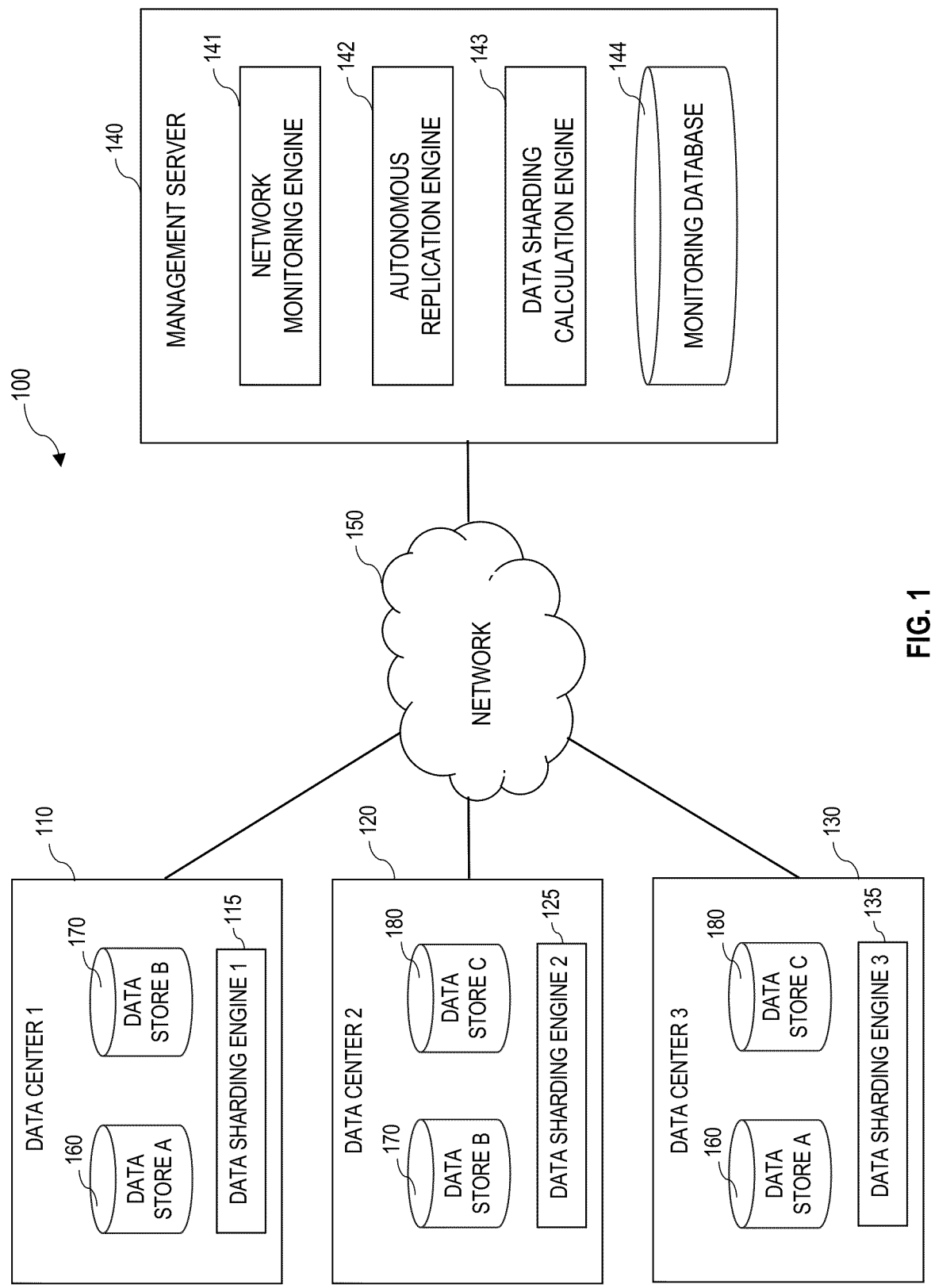
FIG. 1 is diagram of a system which includes components performing autonomous data sharding to meet the recovery time objective (RTO) in an event of a disaster that takes a data center offline, in accordance with one embodiment of the present invention.

FIG. 1 is diagram of system 100 which includes components performing autonomous data sharding to meet the recovery time objective (RTO) in an event of a disaster that takes a data center offline, in accordance with one embodiment of the present invention. System 100 includes multiple data centers, for example, data center 1 110, data center 2 120, and data center 3 130. The number of data centers shown in FIG. 1 is for a purpose of illustration; it should be appreciated that the number of data centers may be any number more than three. Typically, the multiple data centers are located at different sites. System 100 further includes management server 140. As shown in FIG. 1, data center 1 110, data center 2 120, data center 3 130, and management server 140 are interconnected over network 150. Network 150 may be a wired and/or wireless network. Network 150 may be any communication protocol that allows data to be transferred between components of system 100.

Each of the multiple data centers includes one or more data stores. Each of the one or more data stores has multiple copies in at least two of the data centers. Each of the one or more data stores may be separate databases, separate systems, separate shards, or any other subset of data stored within the multiple data centers. As an example shown in FIG. 1, data center 1 110 includes data store A 160 and data store B 170; data center 2 120 includes data store B 170 and data store C 180; data center 3 130 includes data store A 160 and data store C 180. Data store A 160 has two copies, one copy in data center 1 110 and another copy in data center 3 130; data store B 170 has two copies, one copy in data center 1 110 and another copy in data center 2 120; data store C 180 has two copies, one copy in data center 2 120 and another copy in data center 3 130.

Each of the multiple data centers includes a data sharding engine. As an example shown in FIG. 1, data center 1 110 includes data sharding engine 1 115, data center 2 120 includes data sharding engine 2 125, and data center 3 130 includes data sharding engine 3 135. From autonomous replication engine 142 on management server 140, each of the data sharding engines receives information on which data store sharding is needed and information about sharding sizes. Data sharding engine 115 performs the data sharding in data center 1 110; data sharding engine 125 performs the data sharding in data center 2 120; data sharding engine 135 performs the data sharding in data center 3 130.

Management server 140 includes multiple modules. To ensure the RTO is met and at least two copies of the data exists across two or more data centers in an event of a disaster that takes a data center offline, management server 140 performs analysis of all the data stores in respective ones of the data centers, determines when to create one or more data shards and shard sizes, and instructs the data sharding engines in respective ones of the data centers to copy the one or more shards to other data centers.

In the embodiment shown in FIG. 1, management server 140 is located in a computer system separated from the data centers. In another embodiment, management server 140 may be located in anyone of the data centers. In yet another embodiment, management server 140 may be located in at least two data centers to ensure that proper data backup occurs in an event of a disaster that takes one data center offline.

Management server 140 includes network monitoring engine 141, autonomous replication engine 142, data sharding calculation engine 143, and monitoring database 144. Network monitoring engine 141 extracts information about the current network speed for communication between data centers. For example, the rate of data transfer between a first data center and a second data center may be 2 Tb/hr. Autonomous replication engine 142 calls data sharding calculation engine 143 to dynamically calculate the shard sizes to meet the RTO. The calculation of the shard sizes uses information about the network speed and a growth cap. Autonomous replication engine 142 instructs the data sharding engines to execute sharding based on the calculated shard sizes and copy data shards to destination data centers. Autonomous replication engine 142 alters a topology of data storage across multiple data centers such that the RTO can be met in an event of a disaster that takes one or more of the multiple data centers offline.

Monitoring database 144 stores current and historical information about data center topologies, network speeds at different times (e.g., speeds at different times of the day, speeds for different days of the week, speeds during holidays, etc.), and system settings including the RTO, the RPO, the growth cap, and the storage migration constant.

Figure 2:
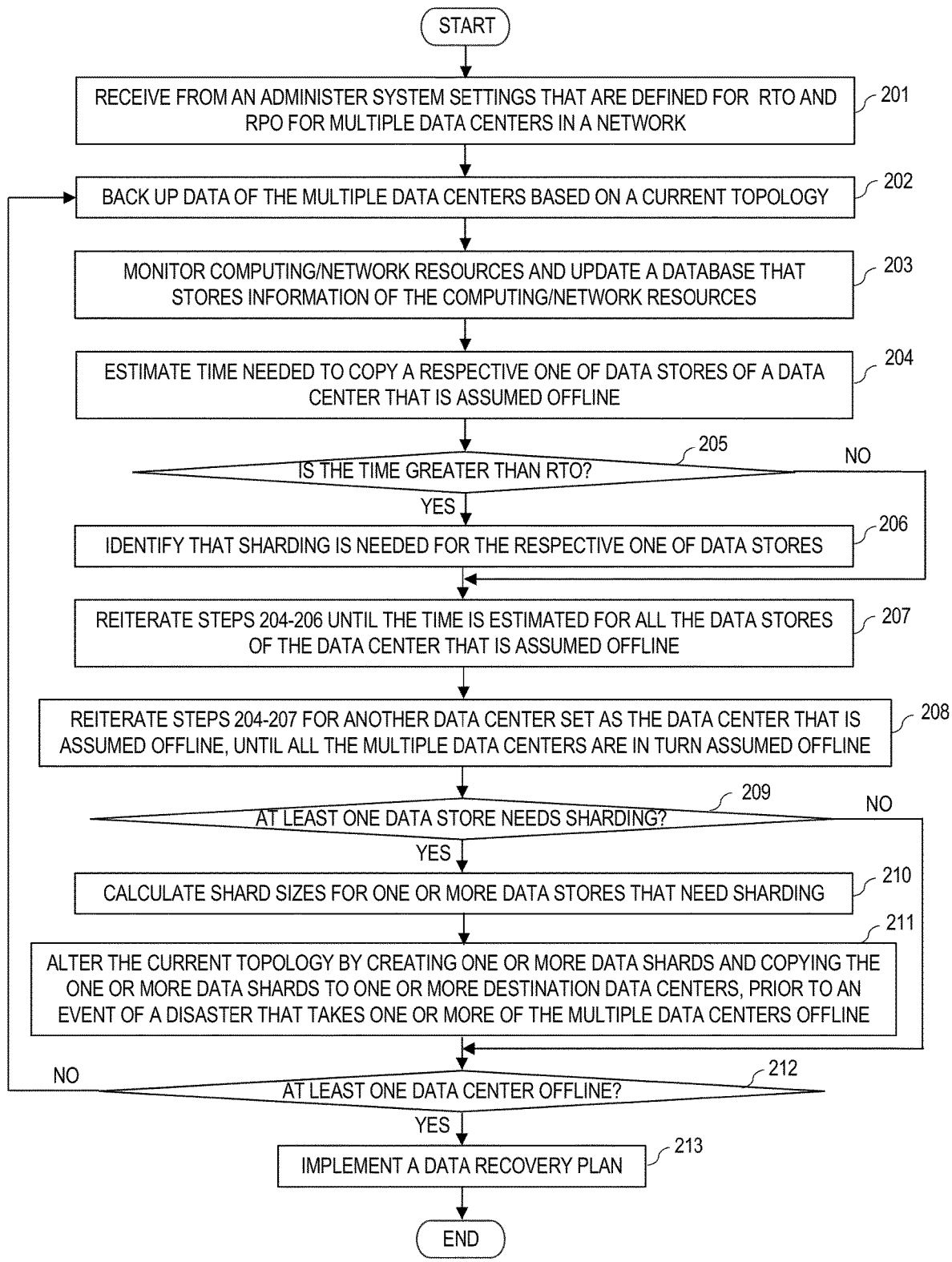
FIG. 2 is a flowchart showing operational steps for altering a topology of data storage across multiple data centers such that the recovery time objective (RTO) can be met in an event of a disaster that takes a data center offline, in accordance with one embodiment of the present invention.

FIG. 2 is a flowchart showing operational steps for altering a topology of data storage across multiple data centers such that the recovery time objective (RTO) can be met in the event of a disaster that takes a data center offline, in accordance with one embodiment of the present invention. The operational steps are implemented by one or more computers or servers. For example, the operational steps are implemented by management server 140 and/or data sharding engines (including data sharding engine 1 115, data sharding engine 2 125, and data sharding engine 3 135) on one or more computers or servers.

In step 201, the one or more computers or servers receive, from an administer, system settings that are defined for RTO and RPO for multiple data centers in a network. The system settings include the RPO, the RTO, a growth cap (γ), and a storage migration constant (μ). The growth cap (γ) ensures that there is sufficient free space after a data shard migration; for example, a growth cap of 80% will ensure that the current data storage at a given data center plus the size of a data shard to be copied into the same data center will sum to less than 80% of a total storage capacity of the data center. The relationship between the storage capacity (C) of the data center, the current used storage(S) of the data center, the growth cap (γ), and the size (σ) of a data shard can be written as $$C \geq \frac{S+\sigma}{\gamma}.$$

The storage migration constant (μ) ensures that the data shard to be copied is sized to be larger than a minimum amount in order to meet the RTO such that any additional data storage will not immediately require sharding and data backup between data centers to occur again. For example, if x is the size of a data shard to be copied from a first data center to a second data center, a storage migration constant of 2 will ensure that a data shard with a size of 2× is copied to the second data center; if this is not done and only a data shard with a size of x is copied, any incoming data to the first data center will immediately require the sharding process to occur again.

For the purpose of illustrating the system and method, the following system settings are used in an example included in later paragraphs of this document. The RTO is 4 hours, the RPO is 0 hours (no data loss allowed), the growth cap (γ) is 80%, and the storage migration constant (μ) is 2.

Figure 3:
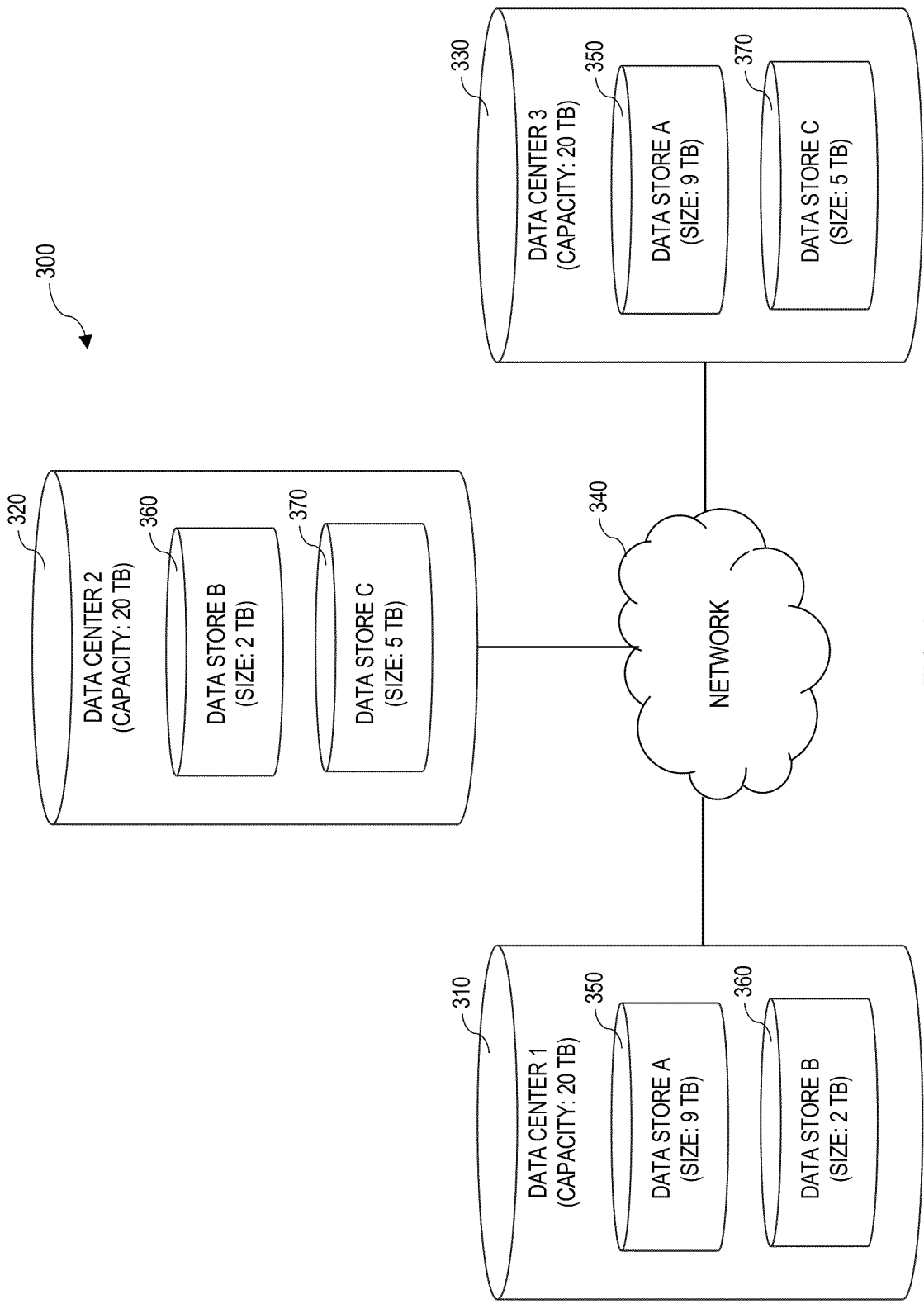
FIG. 3 illustrates an initial state of a data store topology across data centers, in accordance with one embodiment of the present invention.

In step 202, the one or more computers or servers back up data of the multiple data centers based on a current topology. FIG. 3 illustrates initial state 300 of a data store topology across data centers, in accordance with one embodiment of the present invention. Data center 1 310, data center 2 320, and data center 3 330 are interconnected by network 340. At initial state 300 shown in FIG. 3, data center 1 310, data center 2 320, and data center 3 330 include no data shard. A respective one of the data centers includes data for the respective one of the data centers and one or more backups of data for other data centers. For example, data center 1 310 includes data store A 350 and data store B 360, in which data store A 350 is data for data center 1 310 while data store B 360 is a backup of data for data center 2 320; data center 2 320 includes data store B 360 and data store C 370, in which data store B 360 is data for data center 2 320 while data store C 370 is a backup of data for data center 3 330; data center 3 330 includes data store A 350 and data store C 370, in which data store C 370 is data for data center 3 330 while data store A 370 is a backup of data for data center 1 310.

In step 203, the one or more computers or servers monitor computing/network resources and update a database that stores information of the computing/network resources. The database also stores the current topology, historical topologies, and the system settings. The computing/network resources include, but are not limited to, network speeds, CPU utilization, memory utilization, source and destination resources, physical storage capacity, write rate (i.e., used to predict database growth rate), type of facility (e.g., active-active, active-passive, hot site, warm site, and cold site). In an example included in this document, it is assumed (for the purpose of simplification) that the network speed (v) is 2 TB per hour for copying data for both transmit and receive lanes.

In step 204, the one or more computers or servers estimate time needed to copy a respective one of data stores of a data center that is assumed offline. The data center that is assumed offline is a respective one of the multiple data centers. The time needed to copy the data is estimated based on information obtained in step 203. The time needed to copy the data can be calculated by dividing the size of the respective one of data stores by the network speed (v).

Figure 4:
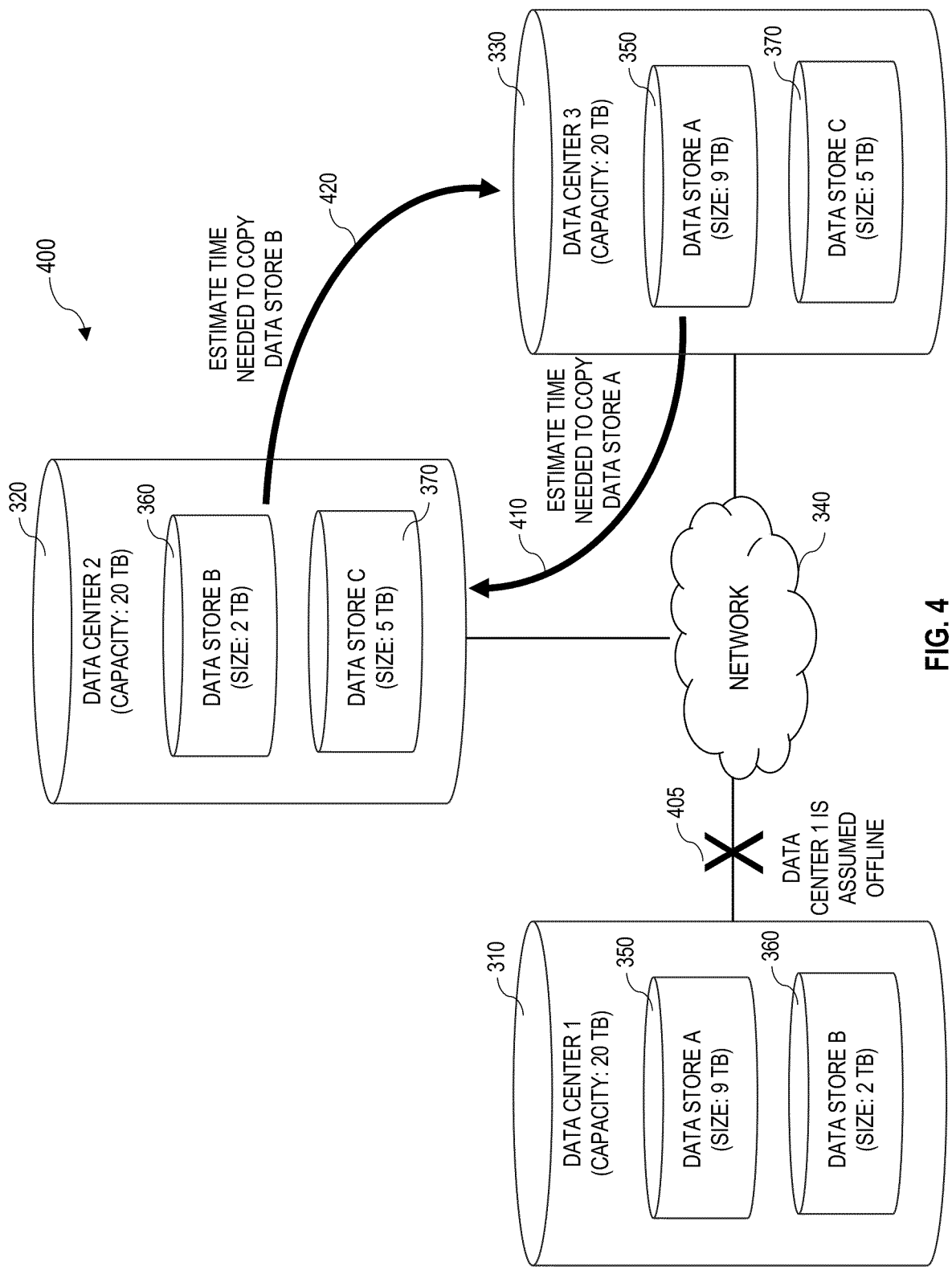
FIG. 4 illustrates a state of a data store topology across data centers where an assumed disaster takes a data center offline, in accordance with one embodiment of the present invention.

FIG. 4 illustrates state 400 of a data store topology across data centers where an assumed disaster takes a data center offline, in accordance with one embodiment of the present invention. In FIG. 4, an estimation of time needed to copy data is shown. The example of executing step 204 (estimating time needed to copy data) is shown in FIG. 4. As shown by numeral 405, dada center 1 310 is assumed offline. As shown by numeral 410, the time needed to copy data store A 350 from data center 3 330 to data center 2 320 is estimated in step 204.

In step 205, the one or more computers or servers compare the estimated time in step 204 with the RTO and determine whether the time needed to copy the data is greater than the RTO. In response to determining that the time needed to copy the data is greater than the RTO (YES branch of step 205), in step 206, the one or more computers or servers identify that sharding is needed for the respective one of the data stores in order to meet the RTO when the data center is offline.

In the example shown in FIG. 4, with the exemplary system settings given in a previous paragraph, the one or more computers or servers determine that the time needed to copy data store A 350 with 9 TB of data from data center 3 330 to data center 2 320 is greater than the RTO (4 hours); therefore, in step 205, the one or more computers or servers identify that data sharding is needed for data store A 350 in order to meet the RTO when dada center 1 310 is offline.

After step 206 or in response to determining that the time needed to copy data is not greater than the RTO (NO branch of step 205), the one or more computers or servers execute step 207, to reiterate steps 204-206 until the time needed to copy data is estimated for all the data stores of the data center that is assumed offline.

The example of executing step 207 (reiterating steps 204-206) is shown in FIG. 4. As shown by numeral 420, the one or more computers or servers determine the time needed to copy data store B 360 from data center 2 320 to data center 3 330. With the exemplary system settings given in a previous paragraph, the one or more computers or servers determine that the time needed to copy data store B 360 with 2 TB of data from data center 2 320 to data center 3 330 is not greater than the RTO (4 hours). Thus, data sharding is not needed for data store B 360, and copying data store B 360 from data center 2 320 to data center 3 330 has no issue for meeting the RTO when dada center 1 310 is offline. In the example shown in FIG. 4, the time is estimated so far for all the data stores (data store A 350 and data store B 360); therefore, step 207 (reiterating steps 204-206) is completed.

After completing step 207, the one or more computers or servers execute step 208. In step 208, the one or more computers or servers reiterate steps 204-207 for another data center set as the data center that is assumed offline, until all the multiple data centers are in turn assumed offline one at a time. In the example shown in FIG. 4, after data center 1 310 is assumed offline, data center 2 320 and data center 3 330 will be in turn assumed offline. When either of the data centers is assumed offline, the one or more computers or servers reiterate steps 204-207. If either of data center 2 320 and data center 3 330 is assumed offline, the time needed to copy data store C 370 with 5 TB of data is estimated. The one or more computers or servers determine that the time needed to copy data store C 370 with 5 TB of data is not greater than the RTO (4 hours). Thus, data sharding is not needed for data store C 370, and copying data store C 370 to another data center has no issue for meeting the RTO.

After completing the iterations of 204-207 for all the multiple data centers, the time needed to copy data has been estimated for each data store across the multiple data centers. From all the data stores in the multiple data centers, the one or more computers or servers identify data stores that need sharding, by comparing the time needed with the RTO. In step 209, the one or more computers or servers determine whether at least one data store needs sharding. In the example shown in FIG. 4, among three data stores (data store A 350, data store B 360, data store C 370), only data store A 350 needs sharding.

Figure 5A:
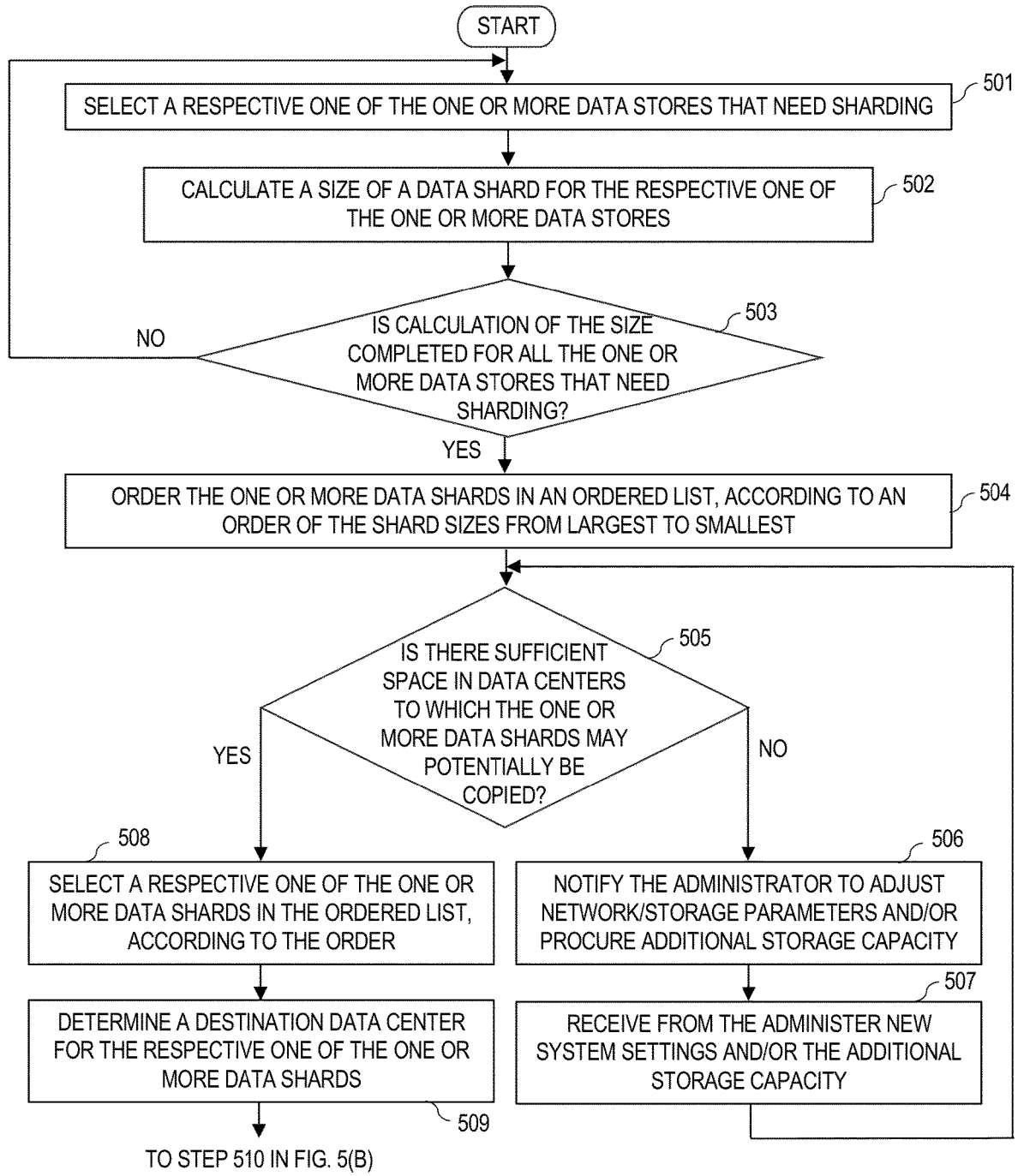
FIG. 5(A) and FIG. 5(B) present a flowchart showing operational steps for calculating shard sizes and determining assignments of one or more data shards to one or more destination data centers, in accordance with one embodiment of the present invention.

In response to determining that at least one data store needs sharding (YES branch of step 209), in step 210, the one or more computers or servers calculate shard sizes for one or more data stores that need sharding. Steps 501-503 in FIG. 5(A) are operational steps for calculating the shard sizes and will be described in later paragraphs with reference to FIG. 5(A).

In step 211, the one or more computers or servers alter the current topology by creating one or more data shards and copying the one or more data shards to one or more destination data centers, prior to an event of a disaster that takes one or more of the multiple data centers offline. The one or more data shards are copied prior to the disaster occurring. During the disaster occurring, the remaining data (which has not been copied to other data centers prior to the disaster) in the one or more data stores that need sharding can be copied within a time period required by the RTO. Therefore, altering the current topology in step 211 ensures the RTO is met in the event of the disaster that takes the one or more of the multiple data centers offline. A topology of the data stores in the multiple data centers in the network is altered to prepare data recovery in the event of the one or more of the multiple data centers being offline.

Figure 5B:
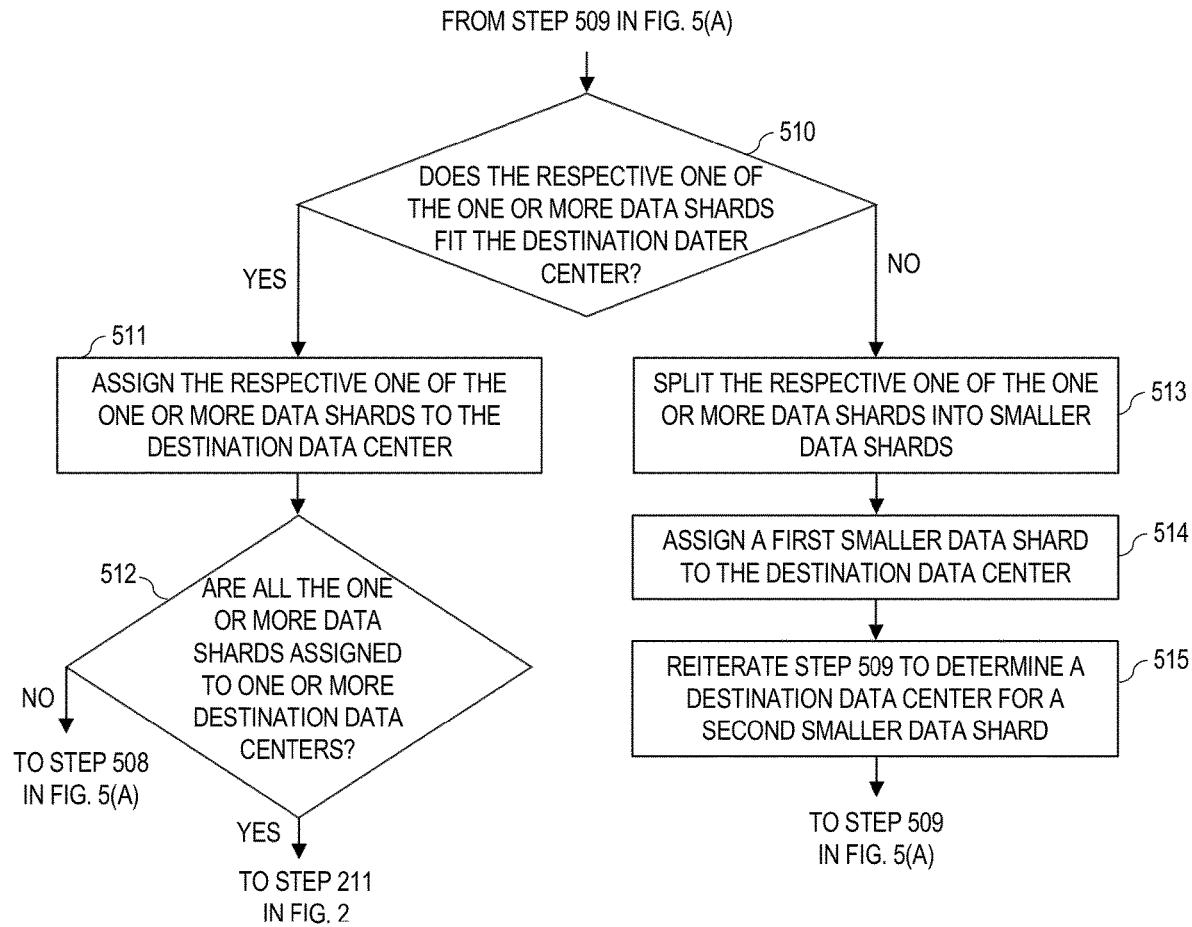

Copying the one or more data shards in step 211 is based on assignments of the one or more data shards to the one or more destination data centers. The assignments are determined by the one or more computers or servers, and steps 504-515 in FIG. 5(A) and FIG. 5(B) are operational steps of determining the assignments. Steps 504-515 will be described in latter paragraphs with reference to FIG. 5(A) and FIG. 5(B).

The one or more computers or servers obtain a new topology after implementing sharding for the one or more data stores that need sharding. The new topology of the data stores across the multiple data centers will be discussed in a later paragraph with reference to the illustration in FIG. 6.

After step 211 or in response to determining that no data store needs sharding (NO branch of step 209), in step 212, the one or more computers or servers determine whether at least one data center is offline. In other words, the one or more computers or servers determine whether there is an event of a disaster that takes one or more of the multiple data centers offline. In response to determining that no data center is offline (NO branch of step 211), the one or more computers or servers reiterate step 202 to back up data of the multiple data centers based on the current topology (when no data store needs sharding) or the new topology (when at least one data store needs sharding).

In response to determining that at least one data center is offline (YES branch of step 211), in step 213, the one or more computers or servers implement a data recovery plan. By implementing the data recovery plan, the one or more computers or servers ensure that backups of all the data stores exist in data centers that are still online after the event of the disaster taking one or more of the data centers offline. Because dynamic sharding has been performed in step 211 for preparation for the disaster, the recovery plan can be completed in a manner that the RTO requirement is met. Implementing the data recovery plan and a new topology after implementing the data recovery plan will be discussed in a later paragraph with reference to FIG. 7.

FIG. 5(A) and FIG. 5(B) present a flowchart showing operational steps for calculating shard sizes and determining assignments of the one or more data shards to the one or more destination data centers, in accordance with one embodiment of the present invention. The operational steps are implemented by one or more computers or servers. For example, the operational steps are implemented by management server 140 on one or more computers or servers.

Referring to FIG. 5(A), in step 501, the one or more computers or servers select a respective one of the one or more data stores that need sharding. The one or more data stores that need sharding are identified in step 206 shown in FIG. 2. In the example shown in FIG. 4, only data store A 350 needs sharding; therefore, data store A 350 is selected in step 501 and is run through the operational steps in FIG. 5(A) and FIG. 5(B). However, in a general case, the one or more data stores that need sharding are in turn selected and are run through the operational steps in FIG. 5(A) and FIG. 5(B).

In step 502, the one or more computers or servers calculate a size of a data shard for the respective one of the one or more data stores that need sharding. Copying the size of the data shard to another data center allows to update a topology of data storage across multiple data centers such that an updated topology meets the RTO in the event of a disaster that unexpectedly takes the data center offline.

In the example shown in FIG. 4, for data store A 350 with 9 TB, calculation of the size of the data shard that is required to be copied prior to the disaster is performed as follows:

$$\sigma = \mu \cdot (S - RTO \cdot v) = 2 \cdot \left(9 \text{ TB} - 4 \text{ hr} \cdot 2\frac{\text{TB}}{\text{hr}}\right) = 2 \text{ TB}.$$

In the above calculation of the size ($\sigma$) of the data shard that is required to be copied prior to the disaster, the exemplary system settings given in a previous paragraph and the capacity value of data store A 350 are used. The storage migration constant ($\mu$) is 2, the storage(S) of data store A 350 is 9 TB, the RTO is 4 hours, the network speed (v) is 2 TB per hour. The size ($\sigma$) of the data shard that is required to be copied prior to the disaster is calculated as 2 TB. For data store A 350, a size of a remaining data shard is calculated as (9 TB−2 TB)=7 TB.

In step 503, the one or more computers or servers determine whether calculation of the size is completed for all the one or more data stores that need sharding. In response to determining that the calculation is not completed (NO branch of step 503), the one or more computers or servers reiterate steps 501 and 502, until the calculation is done for all the one or more data stores that need sharding. In the example shown in FIG. 4, only data store A 350 needs sharding; therefore, no reiteration of steps 501 and 502 is needed.

After the calculation is done for all the one or more data stores that need sharding, the one or more computers or servers obtain sizes of the one or more data shards that are required to be copied to destination data centers prior to the disaster. In response to determining that the calculation is completed (YES branch of step 503), in step 504, in an ordered list, the one or more computers or servers order the one or more data shards, according to an order of the shard sizes from largest to smallest.

In step 505, the one or more computers or servers determine whether there is sufficient space in data centers to which the one or more data shards may potentially be copied. The one or more computers or server determine whether the sufficient space for the calculated shard sizes is available across these data centers with consideration for the growth cap. This step is only a quick check to determine, based on the one or more data shards, whether there is enough capacity across all the data centers to which the one or more data shards may potentially be copied; these data centers do not already contain the one or more data stores that need sharding. In this step, a specific data center where a specific data shard is to be copied has not yet determined. In the example, data store A 350 needs sharding and the size of the data shard is calculated as 2 TB. The data shard is to be copied to data center 2 320 and data center 2 320 is only one that does not already contain data store A 350. Determining whether there is sufficient space on data center 2 320 is as follows:

$$C \geq \frac{S+\sigma}{Y} \rightarrow 20 \text{ TB} \geq \frac{(2 \text{ TB} + 5 \text{ TB}) + 2 \text{ TB}}{0.8} \rightarrow 20 \text{ TB} \geq 11.25 \text{ TB}$$

In the above calculation, the storage capacity (C) of data center 2 320 is 20 TB, the current used storage(S) of data center 2 320 is (2 TB+5 TB), the size (σ) of the data shard is 2 TB, and the growth cap (γ) is 0.8. The above calculation indicates that there is sufficient space in data center 2 320 for the calculated shard size.

In response to determining that there is no sufficient space (NO branch of step 505), in step 506, the one or more computers or servers notify the administrator to adjust network/storage parameters and/or procure additional storage capacity. The administrator is notified that it is not possible to meet the RTO with the current settings and topology in an event of a disaster. The administer will adjust the network/storage parameters and/or procure the additional storage capacity. In some instances, the growth cap (γ) may be increased to temporarily resolve the issue; however, this situation means that data centers are close to their maximum capacities and additional storage should be procured soon. In one embodiment, the one or more computers or servers notify the administrator when current data capacities reach a threshold level (e.g., 70% full).

In step 507, the one or more computers or servers receive from the administer new system settings and/or the additional storage capacity. Upon receiving the new system settings and/or the additional storage capacity, the one or more computers or servers reiterate step 505.

In response to determining that there is sufficient space (YES branch of step 505), in step 508, the one or more computers or servers select a respective one of the one or more data shards in the ordered list, according to the order of the shard sizes from largest to smallest.

In step 509, the one or more computers or servers determine a destination data center for the respective one of the one or more data shards. The determined destination data center must be a data center that does not already contain data of the respective one of the one or more data shards. The one or more computers or servers may obtain a list of potential data centers if more than one data center does not contain the data of the respective one of the one or more data shards; under this situation, the potential data centers may be ordered based on available free space, and a data center with the most free space available will be determined as the destination data center. In another embodiment, policies may be put in place by the administrator to split the respective one of the one or more data shards across the greatest number of data centers for the highest availability and reliability. In yet another embodiment, policies may be put in place by the administrator to split the respective one of the one or more data shards across the fewest number of data centers to optimize energy consumption. In the example shown in FIG. 4, only data center 2 320 does not contain data store A 350 so data center 2 320 is selected as the destination data center.

Referring to FIG. 5(B), in step 510, the one or more computers or servers determine whether the respective one of the one or more data shards fits the destination data center. In other words, the one or more computers or servers determine whether the size of the respective one of the one or more data shards is less than or equal to the remaining available space of the destination data center.

In response to determining that the respective one of the one or more data shards does not fit the destination data center or the size of the respective one of the one or more data shards is greater than the remaining available space of the destination data center (NO branch of step 510), in step 513, the one or more computers or servers split the respective one of the one or more data shards into smaller data shards. A size of each of the smaller data shards is smaller than the original size of the respective one of the one or more data shards; therefore, one of the smaller data shards can fit the destination data center. In step 514, the one or more computers or servers assign a first smaller data shard to the destination data center. In step 515, the one or more computers or servers reiterate step 509 to determine a destination data center for a second smaller data shard. The one or more computers or servers determine whether the second smaller data shard fits this destination data center. If the second smaller data shard fits this destination data center, the one or more computers or servers assign the second smaller data shard to this destination data center; otherwise, the one or more computers or servers split the second smaller data shard and repeat a splitting process of steps 513-515.

In response to determining that the respective one of the one or more data shards fits the destination data center or the size of the respective one of the one or more data shards is not greater than the remaining available space of the destination data center (YES branch of step 510), in step 511, the one or more computers or servers assign the respective one of the one or more data shards to the destination data center.

In step 512, the one or more computers or servers determine whether all the one or more data shards are assigned to one or more destination data centers. In response to determining that not all the one or more data shards are assigned to the one or more destination data centers (NO branch of step 512), the one or more computers or servers select another one of the one or more data shards and reiterate step 508 shown in FIG. 5(A). One or more reiterations of step 508 are executed, until all the one or more data shards are assigned to the one or more destination data centers.

In response to determining that all the one or more data shards are assigned to the one or more destination data centers (YES branch of step 512), the one or more computers or servers finish assignments for all the one or more data shards. Once the assignments are completed, the one or more computers or servers execute step 211 in FIG. 2. When executing step 211, the one or more computers or servers alter the current topology by creating the one or more data shards and copying the one or more data shards to the one or more destination data centers.

Figure 6:
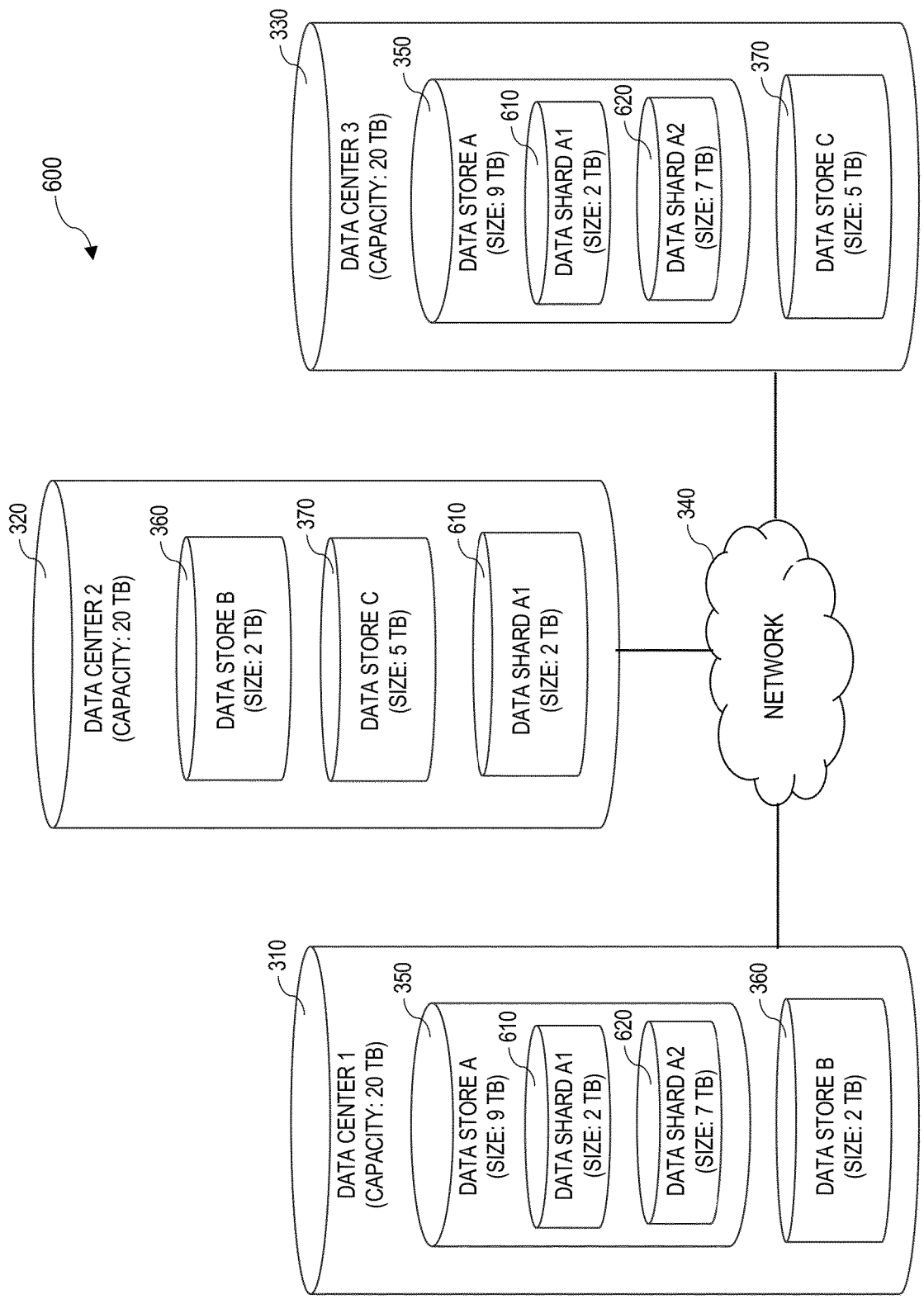
FIG. 6 illustrates a final state of a data store topology across data centers after data sharding is performed to prepare for an event of a disaster that takes a data center offline, in accordance with one embodiment of the present invention.

FIG. 6 illustrates final state 600 of a data store topology across data centers after data sharding is performed to prepare for an event of a disaster that takes a data center offline, in accordance with one embodiment of the present invention. As an example, in step 211 shown in FIG. 2, final state 600 of the data store topology is created. As shown in FIG. 6, data store A 350 is sharded into data shard A1 610 and data shard A2 620. Data shard A1 610 is copied to data center 2 320 prior to an event of a disaster that takes data center 1 310 offline.

As discussed in previous paragraphs with reference to FIG. 2, after the current topology of the data stores across data centers is altered in step 211, the one or more computers or servers determine whether the event of the disaster occurs. In response to determining that the event of the disaster occurs (one of the multiple data centers is offline), in step 213 shown in FIG. 2, the one or more computers or servers implement the data recovery plan.

Figure 7:
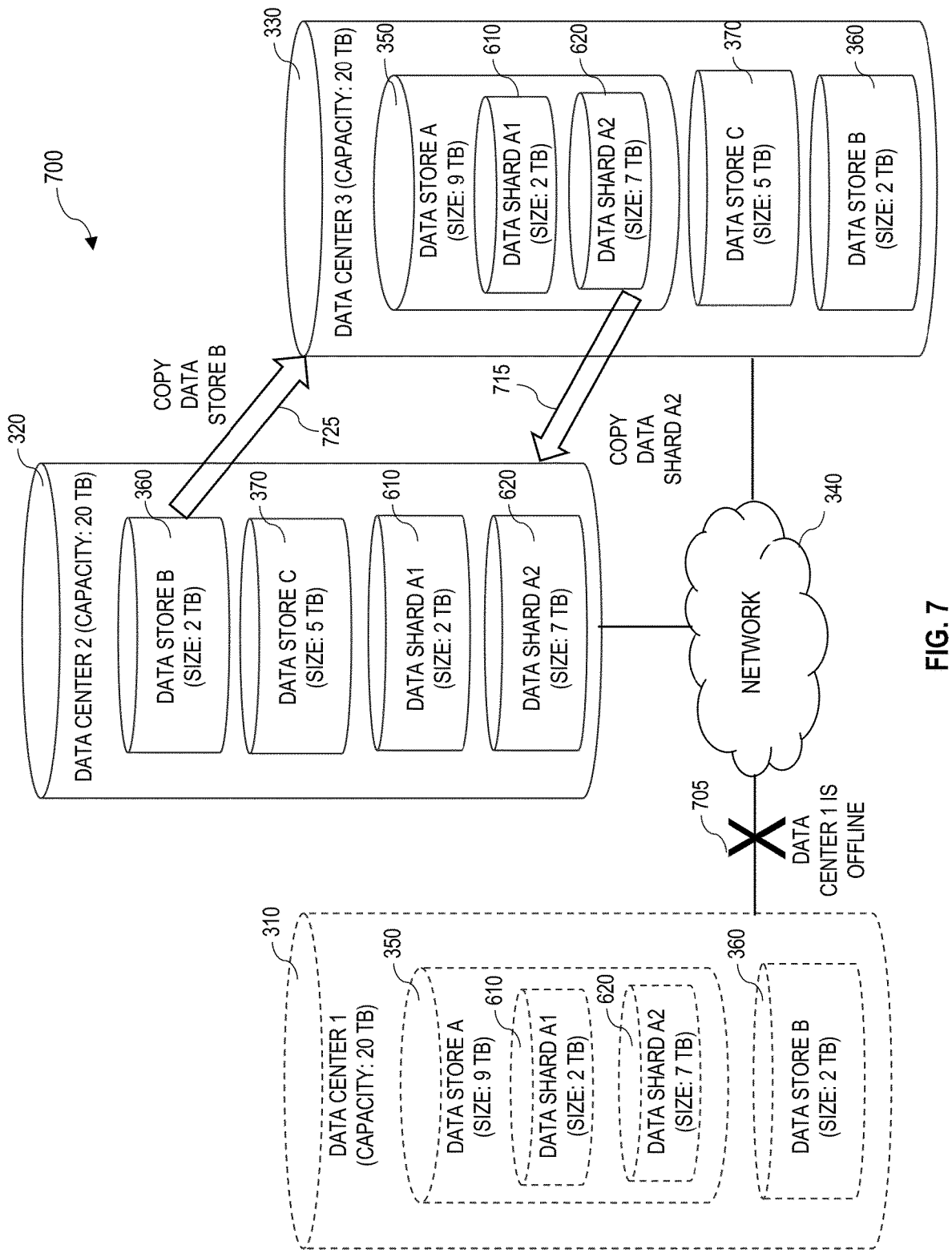
FIG. 7 illustrates implementation of a data recovery plan and a state of a data store topology across data centers after data recovery from a disaster that takes a data center offline, in accordance with one embodiment of the present invention.

As an example, FIG. 7 illustrates implementation of the data recovery plan and state 700 of a data store topology across data centers after data recovery from the disaster that takes data center 1 310 offline. In the example, during the event of the disaster, data center 1 310 is offline (as shown by numeral 705). Prior to the event of the disaster, data shard A1 610 (with 2 TB) has been copied to data center 2 320. In implementing the data recovery plan, as shown by numeral 715, the one or more computers or servers copy a remaining data shard (i.e., data shard A2 620 with 7 TB) from data center 3 330 to data center 2 320; therefore, data center 2 320 has all data of data store A 350 (including data shard A1 610 and data shard A2 620) after the data recovery. Because data shard A1 610 in data store A 360 has been copied to data center 2 320 prior to the disaster, copying data in the remaining data shard (i.e., data shard A2 620) from data center 3 330 to data center 2 320 can be done within the time required by the RTO. In implementing the data recovery plan, as shown by numeral 725, the one or more computers or servers also copy data store B 360 from data center 2 320 to data center 3 330; therefore, data center 3 330 has data store B 360 after the data recovery. As discussed in a previous paragraph with reference to FIG. 4, the time needed to copy data store B 360 with 2 TB from data center 2 320 to data center 3 330 is not greater than the RTO; therefore, copying data store B 360 from data center 2 320 to data center 3 330 has no issue for meeting the RTO. In implementing the data recovery plan, the requirement of RTO is met, due to data sharding and topology alterations prior to the event of the disaster. After implementing the data recovery plan, both data center 2 320 and data center 3 330 have data of all data stores.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
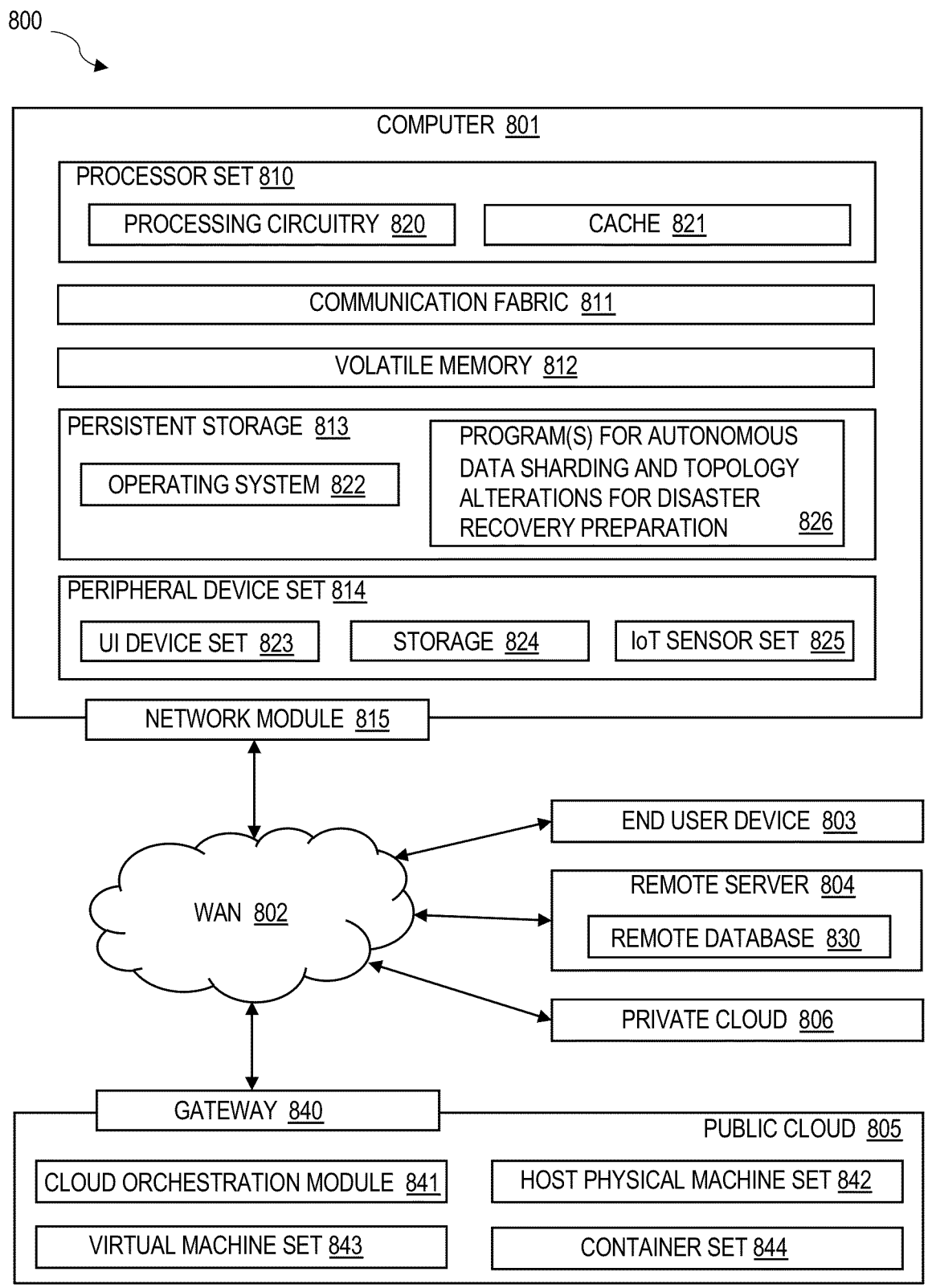
FIG. 8 is a systematic diagram illustrating an example of an environment for the execution of at least some of the computer code involved in performing autonomous data sharding and topology alterations for disaster recovery preparation, in accordance with one embodiment of the present invention.

In FIG. 8, computing environment 800 contains an example of an environment for the execution of at least some of the computer code involved in performing the inventive methods, such as program(s) 826 for autonomous data sharding and topology alterations for disaster recovery preparation. In addition to block 826, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 826, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

Processor set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located off chip. In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 826 in persistent storage 813.

Communication fabric 811 is the signal conduction path that allows the various components of computer 801 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

Persistent storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in block 826 typically includes at least some of the computer code involved in performing the inventive methods.

Peripheral device set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as images. A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

What is claimed is:

1. A computer-implemented method for data sharding and topology alterations for disaster recovery preparation, the method comprising:
   estimating time needed to copy a data store of a data center that is assumed offline;
   determining whether the time needed is greater than a recovery time objective (RTO);
   in response to determining that the time needed is greater than the RTO, creating a data shard for the data store; and
   prior to the data center being offline, altering a current topology of the data store in a network connecting multiple data stores, by copying the data shard to a destination data center that does not contain the data store in the current topology, wherein, with an altered topology, the RTO is met in an event of the data center being offline.

2. The computer-implemented method of claim 1, further comprising:
   determining whether the data center is offline; and
   in response to determining that the data center is offline, copying a remaining data shard of the data store to the destination data center such that the data store has at least two copies in the multiple data stores in the event of the data center being offline, wherein copying the remaining data shard meets the RTO in the event of the data center being offline.

3. The computer-implemented method of claim 2, further comprising:
   in response to determining that the data center is not offline, backing up the data store according to the altered topology.

4. The computer-implemented method of claim 1, further comprising:
   monitoring computing/network resources; and
   wherein estimating the time needed is based on the computing/network resources.

5. The computer-implemented method of claim 1, further comprising:
- estimating the time needed for respective ones of data stores in the multiple data centers that are in turn assumed offline;
- from the data stores in the multiple data centers, identifying data stores that need sharding, by comparing the time needed with the RTO; and
- calculating shard sizes of data shards for respective ones of the data stores that need sharding.

6. The computer-implemented method of claim 5, further comprising:
- determining destination data centers to which the data shards are to be copied; and
- assigning the data shards to respective ones of the destination data centers.

7. The computer-implemented method of claim 5, further comprising:
- according to assignments of the data shards to the respective ones of the destination data centers, prior to an event of one or more of the multiple data centers being offline, copying the data shards to the respective ones of the destination data centers, thereby a topology of the data stores in the multiple data centers in the network is altered to prepare data recovery after the one or more of the multiple data centers being offline.

8. A computer program product for data sharding and topology alterations for disaster recovery preparation, the computer program product comprising a computer readable storage medium having program instructions stored therewith, the program instructions executable by one or more processors, the program instructions executable to:
- estimate time needed to copy a data store of a data center that is assumed offline;
- determine whether the time needed is greater than a recovery time objective (RTO);
- in response to determining that the time needed is greater than the RTO, create a data shard for the data store; and
- prior to the data center being offline, alter a current topology of the data store in a network connecting multiple data centers, by copying the data shard to a destination data center that does not contain the data store in the current topology, wherein, with an altered topology, the RTO is met in an event of the data center being offline.

9. The computer program product of claim 8, further comprising the program instructions executable to:
- determine whether the data center is offline; and
- in response to determining that the data center is offline, copy a remaining data shard of the data store to the destination data center such that the data store has at least two copies in the multiple data stores in the event of the data center being offline, wherein copying the remaining data shard meets the RTO in the event of the data center being offline.

10. The computer program product of claim 9, further comprising the program instructions executable to:
- in response to determining that the data center is not offline, back up the data store according to the altered topology.

11. The computer program product of claim 8, further comprising the program instructions executable to:
- monitor computing/network resources; and
- wherein estimating the time needed is based on the computing/network resources.

12. The computer program product of claim 8, further comprising the program instructions executable to:
- estimate the time needed for respective ones of data stores in the multiple data centers that are in turn assumed offline;
- from the data stores in the multiple data centers, identify data stores that need sharding, by comparing the time needed with the RTO; and
- calculate shard sizes of data shards for respective ones of the data stores that need sharding.

13. The computer program product of claim 12, further comprising the program instructions executable to:
- determine destination data centers to which the data shards are to be copied; and
- assign the data shards to respective ones of the destination data centers.

14. The computer program product of claim 12, further comprising the program instructions executable to:
- according to assignments of the data shards to the respective ones of the destination data centers, prior to an event of one or more of the multiple data centers being offline, copy the data shards to the respective ones of the destination data centers, thereby a topology of the data stores in the multiple data centers in the network is altered to prepare data recovery after the one or more of the multiple data centers being offline.

15. A computer system for data sharding and topology alterations for disaster recovery preparation, the computer system comprising one or more processors, one or more computer readable tangible storage devices, and program instructions stored on at least one of the one or more computer readable tangible storage devices for execution by at least one of the one or more processors, the program instructions executable to:
- estimate time needed to copy a data store of a data center that is assumed offline;
- determine whether the time needed is greater than a recovery time objective (RTO);
- in response to determining that the time needed is greater than the RTO, create a data shard for the data store; and
- prior to the data center being offline, alter a current topology of the data store in a network connecting multiple data centers, by copying the data shard to a destination data center that does not contain the data store in the current topology, wherein, with an altered topology, the RTO is met in an event of the data center being offline.

16. The computer system of claim 15, further comprising the program instruction executable to:
- determine whether the data center is offline; and
- in response to determining that the data center is offline, copy a remaining data shard of the data store to the destination data center such that the data store has at least two copies in the multiple data stores in the event of the data center being offline, wherein copying the remaining data shard meets the RTO in the event of the data center being offline.

17. The computer system of claim 15, further comprising the program instructions executable to:
- in response to determining that the data center is not offline, back up the data store according to the altered topology.

18. The computer system of claim 15, further comprising the program instructions executable to:
- monitor computing/network resources; and
- wherein estimating the time needed is based on the computing/network resources.

19. The computer system of claim 15, further comprising the program instructions executable to:

estimate the time needed for respective ones of data stores in the multiple data centers that are in turn assumed offline;

from the data stores in the multiple data centers, identify data stores that need sharding, by comparing the time needed with the RTO; and calculate shard sizes of data shards for respective ones of the data stores that need sharding.

20. The computer system of claim 19, further comprising program instructions executable to:

determine destination data centers to which the data shards are to be copied;

assign the data shards to respective ones of the destination data centers; and according to assignments of the data shards to the respective ones of the destination data centers, prior to an event of one or more of the multiple data centers being offline, copy the data shards to the respective ones of the destination data centers, thereby a topology of the data stores in the multiple data centers in the network is altered to prepare data recovery after the one or more of the multiple data centers being offline.

* * * * *